United States Patent
Lee

(10) Patent No.: US 10,326,388 B2
(45) Date of Patent: Jun. 18, 2019

(54) LEAD ANGLE CONTROLLER

(71) Applicants: HYUNDAI MOTOR COMPANY, Seoul (KR); KIA MOTORS CORPORATION, Seoul (KR)

(72) Inventor: Myoung Seok Lee, Cheonan-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/616,338

(22) Filed: Jun. 7, 2017

(65) Prior Publication Data

US 2018/0167003 A1 Jun. 14, 2018

(30) Foreign Application Priority Data

Dec. 12, 2016 (KR) .................. 10-2016-0168290

(51) Int. Cl.
*H02P 6/15* (2016.01)

(52) U.S. Cl.
CPC ............ *H02P 6/157* (2016.02); *H02P 6/15* (2016.02)

(58) Field of Classification Search
CPC ...... H02P 6/28; H02P 6/06; H02P 8/22; H02P 8/38; H02P 6/002; H02P 6/153; H02P 6/15; H02P 6/16; H02P 8/14; H02P 21/00; H02P 21/04; H02P 2203/09; H02P 27/085; H02P 6/10; H02P 6/14
USPC ...................... 318/400.01, 400.26, 400.38
See application file for complete search history.

(56) References Cited

U.S. PATENT DOCUMENTS

| | | | | |
|---|---|---|---|---|
| 4,723,514 A | * | 2/1988 | Taniuchi | F02D 13/0284 123/322 |
| 4,949,027 A | * | 8/1990 | Baur | H02P 8/38 318/685 |
| 5,625,360 A | | 4/1997 | Garrity et al. | |
| 6,583,593 B2 | * | 6/2003 | Iijima | H02P 6/18 318/400.02 |
| 6,644,434 B2 | * | 11/2003 | Fujii | B62D 5/0463 180/443 |
| 6,850,026 B2 | * | 2/2005 | Takemori | H02P 8/38 318/685 |

(Continued)

FOREIGN PATENT DOCUMENTS

| | | |
|---|---|---|
| JP | 6-203535 A | 7/1994 |
| KR | 10-2016-0050772 A | 8/2016 |
| KR | 10-1684807 B1 | 12/2016 |

*Primary Examiner* — Rina I Duda

(74) *Attorney, Agent, or Firm* — Brinks Gilson & Lione

(57) ABSTRACT

The present disclosure provides a lead angle controller including: a position sensor configured to detect a position of a rotor of a BLDC motor; a lead angle control unit configured to determine a lead angle based on a detection signal and to output time for compensation of the lead angle as a lead angle control signal; a phase current converter configured to output a phase current conversion signal based on the detection signal and the lead angle control signal, wherein the phase current conversion signal determines a phase current step of a stator of the BLDC motor; and a signal holder configured to, when one detection signal from the position sensor and the lead angle control signal is changed, hold the detection signal and the lead angle control signal and provide the detection signal and the lead angle control signal to the phase current converter at a predetermined time.

10 Claims, 5 Drawing Sheets

(56) References Cited

U.S. PATENT DOCUMENTS

| | | | | |
|---|---|---|---|---|
| 6,850,027 B2* | 2/2005 | Kuwano | H02P 8/14 | 318/685 |
| 7,116,073 B1* | 10/2006 | Sorkin | H02P 23/10 | 318/162 |
| 7,135,829 B1* | 11/2006 | Sorkin | H02P 25/034 | 318/400.07 |
| 7,518,334 B2* | 4/2009 | Hochhausen | H02P 6/16 | 318/599 |
| 7,626,352 B2* | 12/2009 | Hoda | H02P 8/14 | 318/560 |
| 7,728,543 B2* | 6/2010 | Takemori | H02P 8/12 | 318/432 |
| 8,030,865 B2* | 10/2011 | Yasuda | H02P 6/16 | 318/400.07 |
| 8,169,171 B2* | 5/2012 | Kiyamura | H02P 8/38 | 271/264 |
| 8,274,248 B2* | 9/2012 | Hirata | H02P 6/06 | 318/268 |
| 8,598,825 B2* | 12/2013 | Wang | H02P 6/157 | 318/254.1 |
| 8,692,492 B2* | 4/2014 | Sato | H02P 6/06 | 123/406.24 |
| 9,071,179 B2* | 6/2015 | Ishikawa | H02P 6/06 | |
| 9,154,062 B2* | 10/2015 | Yanagihara | B25F 5/00 | |
| 9,300,231 B2* | 3/2016 | Chien | H02P 6/28 | |
| 2002/0113569 A1* | 8/2002 | Iijima | H02P 6/18 | 318/727 |
| 2003/0173929 A1* | 9/2003 | Takemori | H02P 8/38 | 318/685 |
| 2003/0178965 A1* | 9/2003 | Kuwano | H02P 8/14 | 318/685 |
| 2007/0040529 A1* | 2/2007 | Takebayashi | G05B 19/40 | 318/685 |
| 2007/0216335 A1* | 9/2007 | Takemori | H02P 8/12 | 318/685 |
| 2010/0097021 A1* | 4/2010 | Kiyamura | H02P 6/16 | 318/400.14 |
| 2010/0195784 A1* | 8/2010 | Hirata | H02P 6/06 | 377/2 |
| 2013/0076282 A1* | 3/2013 | Wang | H02P 6/153 | 318/400.14 |
| 2013/0170951 A1* | 7/2013 | Sato | H02P 6/06 | 415/1 |
| 2013/0175957 A1* | 7/2013 | Ishikawa | H02P 6/06 | 318/400.23 |
| 2013/0314007 A1* | 11/2013 | Yanagihara | B25F 5/00 | 318/139 |
| 2015/0162855 A1* | 6/2015 | Chien | H02P 27/085 | 318/139 |

* cited by examiner

| phase | PDC Interrupt | Hall sensor | | | Phase order | | | | | |
|---|---|---|---|---|---|---|---|---|---|---|
| | | H3 | H2 | H1 | U_+ | U_- | V_+ | V_- | W_+ | W_- |
| 1 | 1 | 0 | 1 | 0 | 0 | 0 | 0 | 1 | 1 | 0 |
| glitch | 0 | 0 | 1 | 0 | 1 | 0 | 0 | 1 | 0 | 0 |
| 2 | 0 | 0 | 1 | 1 | 0 | 0 | 0 | 1 | 1 | 0 |

FIG. 2

| phase | PDC Interrupt | Hall sensor | | | Phase order | | | | | |
|---|---|---|---|---|---|---|---|---|---|---|
| | | H3 | H2 | H1 | U_+ | U_- | V_+ | V_- | W_+ | W_- |
| 1 | 1 | 0 | 1 | 0 | 0 | 0 | 0 | 1 | 1 | 0 |
| glitch | 1 | 0 | 1 | 1 | 0 | 1 | 0 | 0 | 1 | 0 |
| 2 | 0 | 0 | 1 | 1 | 0 | 0 | 0 | 1 | 1 | 0 |

FIG. 3

— : Phase current
— : Hall sensor signal

— : Phase current
— : Counter electromotive force

LEAD ANGLE CONTROLLER

CROSS REFERENCE TO RELATED APPLICATION

The present application claims priority to and the benefit of Korean Patent Application No. 10-2016-0168290, filed on Dec. 12, 2016, which is incorporated herein by reference in its entirety.

FIELD

The present disclosure relates to a lead angle controller.

BACKGROUND

The statements in this section merely provide background information related to the present disclosure and may not constitute prior art.

In general, a brushless direct current (BLDC) motor, which is a motor formed by replacing a commutator and a brush, which are in mechanical contact with each other, in a DC motor having an electronic rectifying unit, has the advantages of low electromagnetic noise and mechanical noise and a long lifespan. As devices have been increased in performance, reduced in weight and thickness, simplified in structure, and increased in lifespan and parts or materials for semiconductor technology have been developed, the brushless direct-current motor has made great strides and has been used in various fields such as home appliances, information communication devices, vehicles, and medical equipment.

Such brushless direct current motor generally includes rotors, which are permanent magnets, and a stator, which is a fixed wound wire, particularly a three-phase stator. The position of the rotor is detected by a position sensor such as a hall sensor and voltage is repeatedly and alternately applied to the stators, depending on the detected position of the rotor, whereby the brushless direct-current motor is operated.

When the rotor rotates and the brushless direct-current motor is operated, the same effect as when a wire moves in a magnetic field is produced. And, a counter electromotive force, which is an induced electromotive force, is generated in the stators, so a current flows in the stators with a voltage corresponding to the difference between the counter electromotive force and an applied voltage.

Accordingly, for a desired operation of a brushless direct-current motor, voltage should be repeatedly and alternately applied to the stators, that is, the phases of the stators should be changed, simultaneously with signal detection of the hall sensor. However, the point of time at which a wire current flows in the stators is delayed relatively, compared to the point of time at which the phases of the stators are converted due to the influence of wire inductance of the motor. In particular, the larger the inductance and the higher the rotational speed of the motor, the larger the delayed angle of a phase current, which may cause reduction in efficiency and torque of a brushless direct-current motor.

SUMMARY

We have discovered that it is preferable to convert a phase current at an angle advanced by a predetermined angle α ahead of the point of time of converting the phase when operating the brushless direct-current motor. The angle α is called a "lead angle" and the magnitude of α may be determined on the basis of the resistance, inductance, and rotational speed of the motor.

In order to control a lead angle in the related art, there have been a method of controlling a lead angle by detecting a phase difference between an input signal and an output signal and estimating a lead angle amount depending on the rotational speed of a motor through a phase-locked loop (PLL) for maintaining the frequency of an output signal at a predetermined level by controlling a voltage control oscillator, and a method of controlling information about a lead angle by estimating a lead angle through curve fitting. Further, a lead angle controller has been disclosed in Korean Patent Application Publication No. 10-2015-0159499 by the inventor(s) (titled, "Lead Angle Controller"). The lead angle controller includes: an object function derivation unit that calculates a lead angle for compensating for delay of phase current conversion for phase conversion of a plurality of stators according to the rotational speed of a BLDC motor; and an encoder that determines the point of time of controlling a lead angle in a phase conversion step by counting the number of phase conversion pulses, which is the number of pulses counted during a phase conversion step, and by deriving the number of lead angle pulses, which is the number of pulses corresponding to the lead angle calculated from the object function.

The lead angle controller in the related art determines the point of time of conversion of a phase current by combining a plurality of hall sensor signals with a lead angle control signal for compensating for a lead angle, but the hall sensor signals and the lead angle control signals are not accurately synchronized, so a glitch is generated. The glitch causes undesired motor output, thereby reducing the output torque of the motor or causing torque ripple.

The present disclosure provides a lead angle controller that can suppress the generation of a glitch when a hall sensor signal and a lead angle control signal are not accurately synchronized in the process of converting the phase current of a motor on the basis of the hall sensor signal for the position of a rotor in the motor and the lead angle control signal for determining the point of time of compensating for a lead angle.

An aspect of the present disclosure provides a lead angle controller including: a position sensor configured to detect a position of a rotor of a brushless direct current (BLDC) motor; a lead angle control unit configured to determine a lead angle based on a detection signal from the position sensor and to output time for compensation of the lead angle as a lead angle control signal; a phase current converter configured to output a phase current conversion signal for determining a phase current step of a stator of the brushless direct-current motor on the basis of the detection signal from the position sensor and the lead angle control signal; and a signal holder for, when one detection signal from a plurality of the detection signals from the position sensor and the lead angle control signal is changed, holding a previous detection signal from the position sensor and a previous lead angle control signal and then providing the detection signal from the position sensor and the lead angle control signal to the phase current converter at a predetermined moment.

The signal holder may be a flip-flop configured to input the detection signal of the position sensor and the lead angle control signal and to keep a value inputted by a control pulse for a predetermined time.

The flip-flop may be a D-flip-flop configured to output and keep a value inputted at a rising edge or a falling edge of a control pulse having a predetermined frequency.

The position sensor may be a hall sensor configured to sense a S-pole or a N-pole on a rotor of the brushless direct-current motor.

The phase current converter may output a phase current conversion signal for determining a phase current step, which is set in advance, to an inverter that provides a phase current to the brushless direct-current motor based on the detection signal of the position sensor and the lead angle control signal.

Another aspect of the present disclosure provides a lead angle controller including: a position sensor configured to detect a position of a rotor of a brushless direct current (BLDC) motor; a lead angle control unit configured to determine a lead angle on the basis of a detection signal from the position sensor and to outputtime for compensation of the lead angle as a lead angle control signal; a phase current converter outputting a phase current conversion signal for determining a phase current step of a stator of the brushless direct-current motor on the basis of the detection signal from the position sensor and the lead angle control signal; and a flip-flop configured to input the detection signal of the position sensor and the lead angle control signal, to output the input to the phase current converter at one of a rising edge and a falling edge of a control pulse having a predetermined frequency, and keeping previous output until a subsequent rising edge or a falling edge is generated in the control pulse.

With the lead angle controller, it is possible to synchronize a rotor position detection signal and a lead angle control signal of a BLDC motor that is a reference for phase current conversion, so it is possible to suppress glitches.

In addition, with the lead angle controller, as a glitch is suppressed, it is possible to remove distortion in a phase current provided to the BLDC moor and a counter electromotive force of the BLDC motor. Accordingly, the torque waveform of the BLDC motor, which is expressed as a multiple of the counter electromotive force and a current, is improved, which can contribute to reducing torque ripple and improving stability in driving.

Further, with the lead angle controller, as the torque ripple is reduced, noise and vibration of the BLDC motor can be reduced, and the efficiency of the BLDC motor can be improved by enhancing torque performance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 2 and 3 are views showing an example when a glitch, which can be removed by a lead angle controller, is generated;

Figure 1:
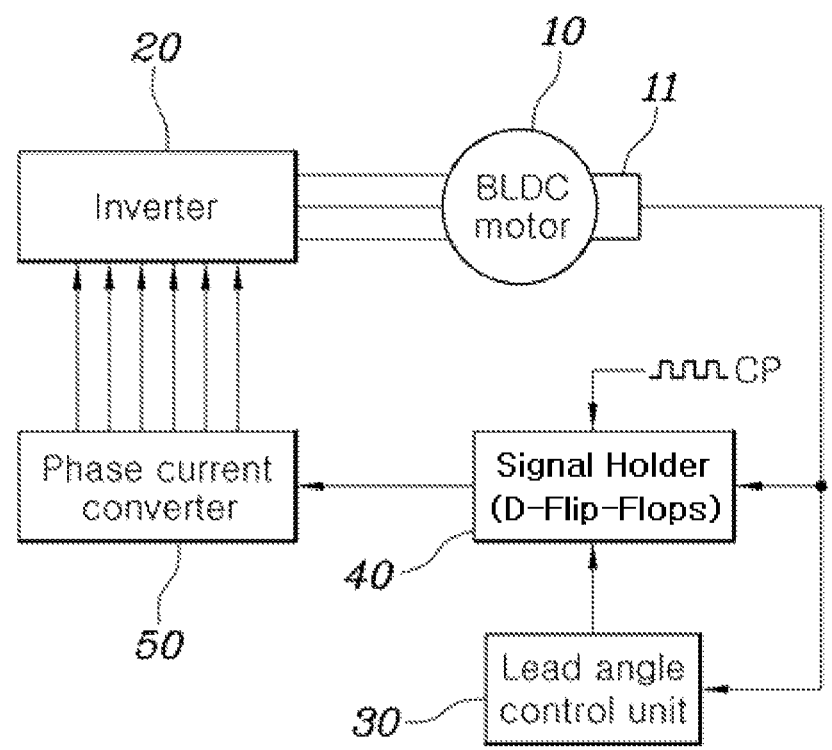
FIG. 1 is a block diagram schematically showing a lead angle controller.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a block diagram schematically showing a lead angle controller in some forms of the present disclosure.

Referring to FIG. 1, a lead angle controller in some forms of the present disclosure may include: a position sensor 11 that detects the position of a rotor of a brushless direct current (BLDC) motor 10; a lead angle control unit 30 that determines a lead angle on the basis of a detection signal from the position sensor 11 and outputs a point of time of compensating for the determined lead angle as a lead angle control signal; a phase current converter 50 that outputs a phase current conversion signal for determining a phase current step of a stator of the brushless direct-current motor 10 on the basis of the detection signal from the position sensor 11 and the lead angle control signal; and a signal holder that, when at least one of the detection signal from the position sensor and the lead angle control signal is changed, holds a previous detection signal from the position sensor and a previous lead angle control signal and then provides the detection signal from the position sensor and the lead angle control signal to the phase current converter 50 at a predetermined point of time.

The BLDC motor 10 may include stators and a rotor. For example, the stators may be three-phase (U, V, W) stators, may be arranged at intervals of 120 degrees, and may operate as magnetic poles (i.e. an N-pole or an S-pole), depending on the direction of the current flowing in the stators. Here, the BLDC motor can rotate the rotor in a two-phase excitation manner, that is, in a manner in which only two phases of the three phases (U, V, W) are excited, and the remaining one phase is not excited. That is, the BLDC motor 10 can rotate the rotor in a 6-step phase conversion manner that selectively generates a potential difference of two phase stators, among the three phase (U, V, W) stators.

Although the BLDC motor includes three phases (U, V, W) and converts a phase in six steps in accordance with excitation types (U+, U−, V+, V−, W+, W−) of three phase (U, V, W) stators in the above description, the phase conversion steps of the stators may be changed in accordance with the number of stators. For example, in the case where six or more phase stators are provided, the phases of the stators may be converted in twelve steps.

As described above, the BLDC motor 10 can rotate the rotor by converting the phases of stators, but the BLDC motor 10 has to excite two phase stators of three phase (U, V, W) stators in accordance with the rotational state of the rotor, so it is desired to make the information about the rotational state of the rotor clear.

For example, without a S-pole of the rotor accurately positioned between the U-phase stator excited at a +potential and the W-phase stator excited at a −potential through the phase conversion step, when the stators are converted to the next phase conversion step, the rotor may show irregular rotation or may rotate reversely while it rotates. Accordingly, the BLDC motor 10 can keep the rotor rotating by converting the phases of the stators to the next step after the rotor stops rotating, by accurately finding out the rotation type of the rotor.

As described above, the BLDC motor 10 may necessarily include a position sensor to detect the rotational state of the rotor and achieve accurate rotation of the rotor on the basis of the rotational state. The position sensor is not specifically limited as long as it can determine the rotational state of the rotor, for example, a hall sensor 11, which can sense stimulation of an S-pole or an N-pole of the rotor, may be generally used.

The hall sensor 11 can convert a signal for stimulation, sensed from the rotor, into an electrical signal and transmit the electrical signal to an inverter that applies current to the stators. The hall sensor 11 may be designed to sense an N-pole or an S-pole of the poles of the rotor, and it may be a variable condition that can be freely changed by the designer of the hall sensor 11, but for the convenience of describing the present disclosure it is exemplified herein that the hall sensor 11 has been designed to sense the N-pole of the rotor. In particular, the hall sensor 11 may be disposed between the three phase (U, V, W) stators, and it is exemplified herein that there are three phase (U, V, W) stators and that hall sensors are provided between the three phase (U, V, W) stators.

The rotor can be rotated by converting the phases of the three phase (U, V, W) stators, and in this case, the hall sensor 11 at the position facing the N-pole of the rotating rotor can sense the N-pole of the rotor. For example, in a phase conversion step, the N-pole of the rotor may be sensed by the hall sensors at both sides of the V-phase stator, and the N-pole of the rotor may be sensed by the hall sensor positioned between the V-phase stator and the W-phase stator in the next phase conversion step.

As described, the N-pole of the rotor can be sensed by the hall sensor 11 and the signal detecting the N-pole of the rotor by the hall sensor 11 can be converted into an electrical signal and transmitted to the inverter 20. The inverter 20 can apply current to the stator to excite the stators in accordance with the transmitted electrical signal. Accordingly, the phase currents of the stators are converted by the current applied from the inverter, whereby the rotor is rotated.

Detecting the N-pole of the rotor by means of the hall sensor 11 may be understood as completion of phase conversion of a plurality of stators. The rotor is rotated by phase conversion of the three phase (U, V, W) stators in each phase conversion step, and when the N-pole of the rotating rotor is sensed by the hall sensor 11, it can be understood that the rotation of the rotor has finished in the corresponding phase conversion step, and then the phase conversion step is changed to another phase conversion step, whereby the phases of the stators are converted again and the rotation of the rotor can be maintained. Accordingly, the detection of the N-pole of the rotor by means of the hall sensor 11 is understood as completion of phase conversion of the stators.

Further, the hall sensor 11 can detect the rotational speed of the BLDC motor 10. In detail, the hall sensor 11 can sense the rotational type of the rotor in each phase conversion step of the stators, so the hall sensor 11 can simply sense the rotational speed of the rotor, that is, the rotational speed of the BLDC motor 10, by deriving the rotation and the required time of the rotation of the rotor.

The technology described about sensing the rotational speed of the rotor using the hall sensor 11 is well known in the related art, so it is not described in detail.

In order to keep the rotor rotating, that is, keep the BLDC motor 10 operating, the inverter 20 is required to continuously convert the phase currents of the stators on the basis of electrical signals from the hall sensor 11, and to this end, the inverter 20 receives electrical signals, that is, phase conversion completion signals of the stators, from the hall sensor 11, and applies current to the stators to be excited through phase conversion, which can be considered to be a desired operation of the BLDC motor 10.

However, when a current is applied to stators to be excited through phase conversion by the inverter 20, action that interferes with change in magnetic flux around or through stators receiving the current, that is, inductance, is generated in the stators. Thus, a current to be applied to the stators to be excited, that is, phase current conversion is delayed. The higher the frequency of the current, the larger the inductance. This results in an increased delay of phase current relative to the point of phase conversion of the stators, and the delay of the phase current may causes reduction of efficiency and torque performance of the BLDC motor 10.

Accordingly, a method of controlling a lead angle is desired when operating the BLDC motor to prevent deterioration of the performance of the BLDC motor 10 due to the delay of phase current conversion for phase conversion of a stator.

The lead angle is set at the point of time of applying a current to operate the BLDC motor 10, and it is possible to sufficiently compensate for delay of phase current for phase conversion of a stator by controlling the point of time of converting phase current of the stator through control of the lead angle when operating the BLDC motor 10.

A lead angle controller has been disclosed in Korean Patent Application Publication No. 10-2015-0159499 by the inventor(s) (titled, "Lead Angle Controller"). The lead angle controller includes: an object function derivation unit that calculates a lead angle for compensating for delay of phase current conversion for phase conversion of a plurality of stators according to the rotational speed of a BLDC motor; and an encoder that determines the point of time of controlling a lead angle in a phase conversion step by counting the number of phase conversion pulses, which is the number of pulses counted during a phase conversion step, and by deriving the number of lead angle pulses, which is the number of pulses corresponding to the lead angle calculated from the object function.

In some forms of the present disclosure, a delay angle control unit 30 may be understood as a concept including the object function derivation unit and the encoder disclosed in Korean Patent Application Publication No. 10-2015-0159499. Further, all other types of lead angle controllers that derive a lead angle and output time for compensation of the lead angle using methods of deriving a lead angle other than the method of controlling a lead angle disclosed in Korean Patent Application Publication No. 10-2015-0159499 may be used as the lead angle control unit 30 of the present disclosure.

The phase current converter 50 can control phase current conversion of the stators by controlling the current that is applied to the stators to be excited through phase conversion of the BLDC motor 10. The phase current converter 50 can control the phase current conversion on the basis of a lead angle control signal provided from the lead angle control unit 30 and a signal from the position sensor 11 (that is, a hall sensor) on the BLDC motor 10.

For example, the phase current converter 50 can output a phase current conversion signal for determining a phase current step, determined in advance, to the inverter 20 by combining the signal from the position sensor 11 and the lead angle control signal. The inverter 20 may include a plurality of switching devices for producing a current for each phase, and two switching devices may be provided for each phase, so phase current may be determined by alternately turning on/off the two switching devices for each phase. The phase current conversion signals provided for each of the two switching devices for each phase may be expressed as U+, U−, V+, V−, W+, and W−.

The phase current converter 50 can receive a detection signal of the position sensor 11 and a lead angle control signal from the signal holder 40.

When the detection signal of the position sensor 11 and the lead angle signal are not changed, the signal holder 40 holds the previous detection signal of the position sensor and the previous lead angle signal for a predetermined time and provides a changed detection signal of the position sensor and a changed lead angle control signal to the phase current converter 50 at a predetermined time.

That is, even if the detection signal of the position sensor 11 and the lead angle control signal are not synchronized, but are partially changed, the signal holder 40 keeps and transmits the previous detection signal of the position sensor 11 and the previous lead angle control signal to the phase current converter 50 so that the phase current step is not changed and the detection signal of the position sensor 11 and the lead angle control signal are simultaneously outputted to the phase current converter 50 after a predetermined amount of time has passed. Accordingly, the lead angle controller in some forms of the present disclosure can reduce glitches due to the failure to synchronize the detection signal of the position sensor 11 and the lead angle control signal.

FIGS. 2 and 3 are views showing an example when a glitch that can be removed by a lead angle controller is generated in some forms of the present disclosure.

In FIGS. 2 and 3, 'phase' shows a phase current step, 'PDC' shows a lead angle control signal, 'Hall sensor' shows the rotational angle detection signal of a BLDC motor outputted from a plurality of hall sensors, and 'Phase order' shows a phase current conversion signal determined on the basis of a lead angle control signal and a position detection signal. Further, the signals '0' and '1' respectively mean a disabled state and an enabled state of signals.

Referring to FIG. 2 first, in step 1, when the lead angle control signal is enabled and H2 of hall sensors is enabled, the phase current conversion signals outputted from the phase current converter 50 are 0, 0, 0, 1, 1, and 0 for U+, U−, V+, V−, W+, and W−, respectively. In this case, the lead angle control unit 30 has enabled the lead angle control signal even if the hall sensor signal maintains the hall sensor signal designated in step 1 in order to output first the phase current conversion signal in step 2, which is the step subsequent to the step 1, to compensate for the lead angle.

In a desired operation, when step 2 is entered, as in the lowermost row of the table shown in FIG. 2, the lead angle control signal is disabled, and H2 and H1 of the hall sensors are enabled, and phase current conversion signals of 0, 0, 0, 1, 1, and 0 are supposed to be sequentially outputted for U+, U−, V+, V−, W+, and W− from the phase current converter 50, as when the lead angle control signal was enabled in step 1. However, when the desired operation is not performed, the lead angle control signal outputted from the lead angle control unit 30 is disabled first, and the hall sensor signal is maintained at the hall sensor signal in step 1, the phase current converter 50 makes undesired output, that is, outputs a phase current conversion signal that is outputted when the lead angle control signal is disabled and only the signal from the hall sensor H2 is enabled. This operation of the lead angle controller causes glitches.

FIG. 3 shows the case when a hall sensor signal is changed first or a lead angle control signal is disabled late with the lead angle control signal in step 1 enabled. In this case, the phase current converter 50 still outputs an undesired phase current conversion signal between step 1 and step 2, which causes a glitch.

The signal holder 40 is provided in various forms of the present disclosure to remove the cause of glitches, as described above.

As described above, even if the detection signal of the position sensor 11 and the lead angle control signal are not synchronized but are partially changed, the signal holder 40 keeps and transmits the previous detection signal of the position sensor 11 and the previous lead angle control signal to the phase current converter 50 so that the phase current step is not changed, and the detection signal of the position sensor 11 and the lead angle control signal are simultaneously outputted to the phase current converter 50 after a predetermined amount of time has passed. That is, even if at least one of a detection signal of the position sensor 11 (a plurality of hall sensor signals) and a lead angle signal is changed first, this is not immediately reflected, and the previous signals are kept for a predetermined time, and then the detection signal of the position sensor 11 and a lead angle control signal, which are inputted after a predetermined amount of time has passed, are provided to the phase current converter 50. That is, the signal holder 40 keeps the previous detection signal of the position sensor and the previous lead angle control signal for a delay time so that all of the signals required for the phase current converter 50 to output a phase current conversion signal can be changed. Further, after the delay time passes, the signal holder 40 simultaneously provides the entire changed values of the detection signal of the position sensor 11 and the lead angle signal to the phase current converter 50, whereby it is possible to reduce glitches due to failure to synchronize the detection signal of the position sensor 11 and the lead angle control signal. The signal holder 40 provides not a magnitude of the lead angle but a point of time compensating for the lead angle as a lead angle control signal (0 or 1).

In some forms of the present disclosure, the signal holder 40 may be a flip-flop. In particular, the signal holder 40 may include a plurality of D-flip-flops provided for each of a plurality of detection signals of the position sensors 11 and lead angle control signals and the D-flip-flops may be operated by a common control pulse (CP).

A D-flip-flop is a device for keeping input for a predetermined time using a control pulse, and may be composed of a plurality of logic devices. That is, a D-flip-flop is a device that outputs data inputted at a rising edge (or a falling edge) of a control pulse. The D-flip-flop is a device well known in the art, so it can be understood sufficiently well for those skilled in the art to embody the present disclosure even if it is not described with reference to the figures.

Figure 4:
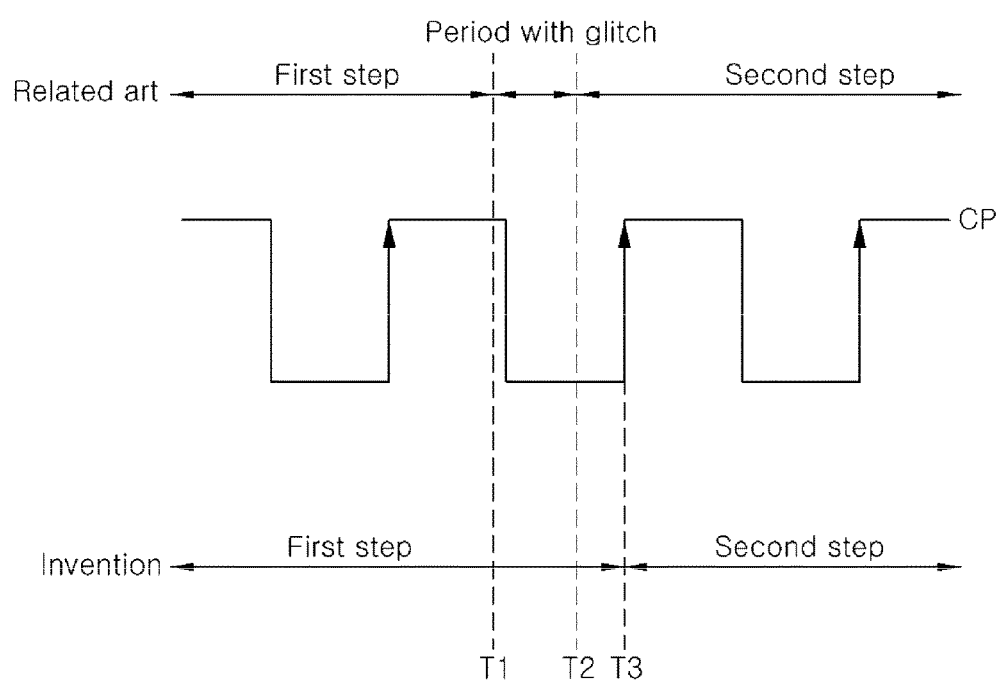
FIG. 4 is a timing diagram comparing the operation of a lead angle controller with a lead angle controller of the related art.

FIG. 4 is a timing diagram comparing the operation of a lead angle controller in some forms of the present disclosure with a lead angle controller of the related art.

Referring to FIG. 4, when a detection signal of the position sensor and a lead angle control signal, which are inputted to the phase current converter 50 while the phase current state of a first step is changed into the phase current state of a second step, a glitch is generated between the first step and the second step.

In contrast, in some forms of the present disclosure, the phase current of the first step can be maintained even at the point of time T1 where at least one of a detection signal from the position sensor 11 and a lead angle control signal is changed, and the detection signal of the position sensor 11 and the lead angle control signal can be provided to the phase current converter 50 at the point of time T3 where a first rising edge is shown in the control pulse CP of the D-flip-flop after the point of time T1 by the signal holder 40, which is a D-flip-flop. That is, the signal holder 40 keeps the detection signal of the position sensor 11 and the lead angle control signal, which are provided to the phase current converter 50 in the previous first step while a glitch is generated in the related art, and provides sufficient time for all of the detection signal of the position sensor 11 and the lead angle control signal to be changed within the points of time T1 to T3. As a result, all of the detection signal of the position sensor 11 and the lead angle control signal are changed and then simultaneously transmitted to the phase current converter 50.

The control pulse CP can be appropriately determined in consideration of the errors of the points of time where the detection signal of the position sensor 11 and the lead angle control signal are changed. Further, considering that the error of the points of time where a detection signal and a lead angle control signal are actually changed in a BLDC motor is very short, by setting a large frequency for the control pulse CP, it is possible to increase the effect of removing glitches and compensating for a lead angle.

Figure 5:
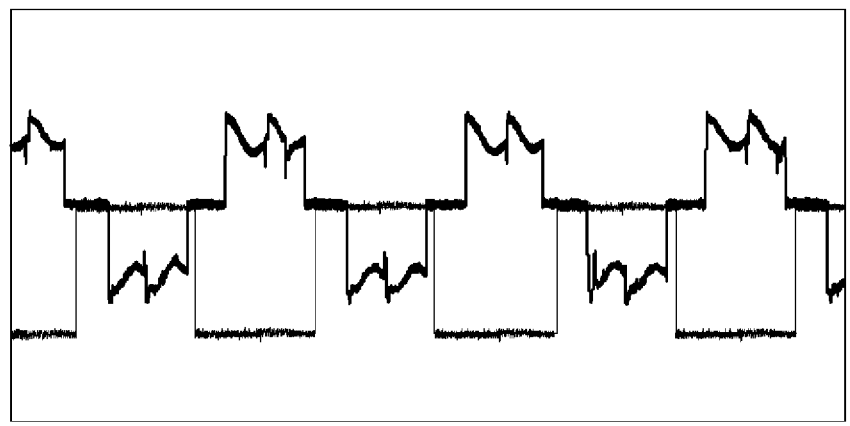
FIG. 5 is a waveform showing the characteristics of a BLDC motor attributable to a lead angle controller having no method of removing glitches.
Figure 5:
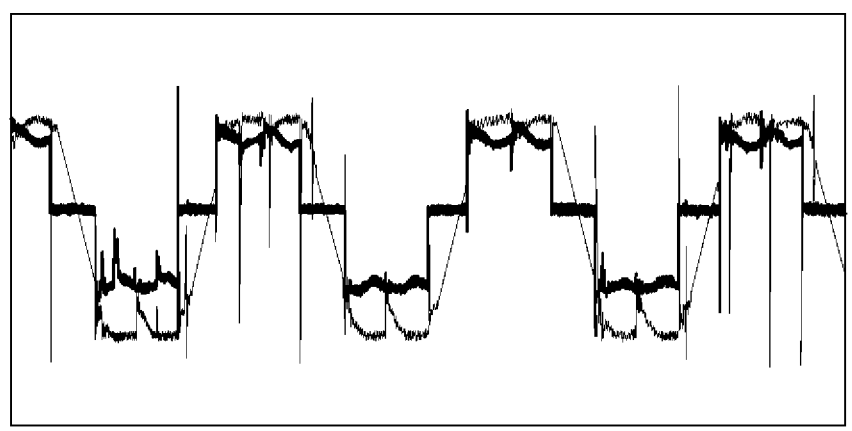
Figure 6:
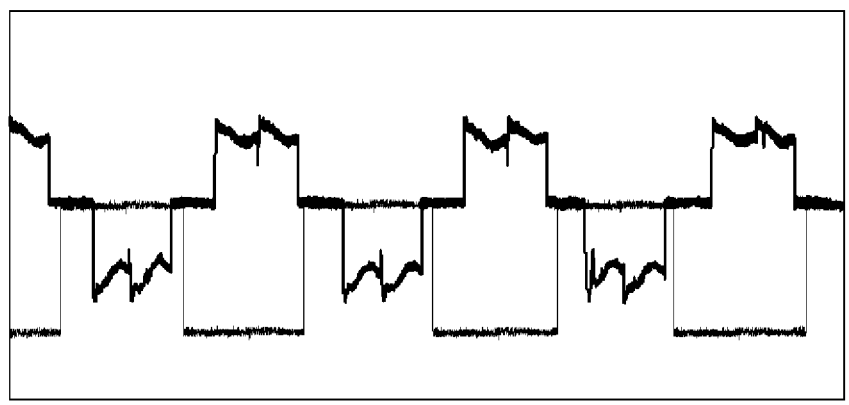
FIG. 6 is a waveform showing the characteristics of a BLDC motor attributable to a lead angle controller, with glitches removed by the lead angle controller.
Figure 6:
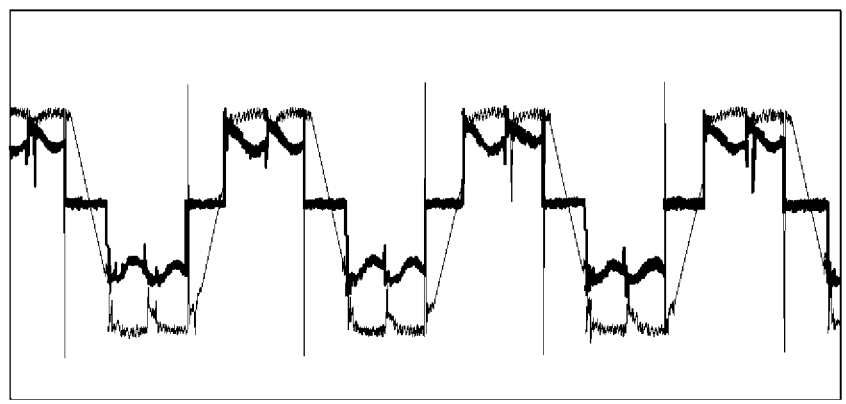

FIG. 5 is a waveform showing the characteristics of a BLDC motor due to a lead angle control having no method of removing glitches, and FIG. 6 is a waveform showing the characteristics of a BLDC motor due to a lead angle controller with glitches removed by the lead angle controller in some forms of the present disclosure.

Comparing FIGS. 5 and 6, it can be seen that during a method of removing glitches (FIG. 5), the waveforms of the phase current provided to a BLDC motor and the counter electromotive force of the BLDC are severely distorted. However, when a method of removing glitches is applied (FIG. 6), it can be seen that the distortion of the waveforms of the phase current provided to a BLDC motor and the counter electromotive force of the BLDC are remarkably decreased. The torque of a BLDC motor can be expressed as a multiple of counter electromotive force and current, so the torque waveform is improved, which can contribute to reducing torque ripple and improving stability in driving. Further, as the torque ripple is reduced, noise and vibration of the BLDC motor can be reduced, and the efficiency of the BLDC motor can be improved by the improvement of torque performance.

The description of the disclosure is merely exemplary in nature and, thus, variations that do not depart form the substance of the disclosure are intended to be within the scope of the disclosure. Such variations are not to be regarded as a departure from the spirit and scope of the disclosure.

What is claimed is:

1. A lead angle controller comprising:
   a position sensor configured to detect a position of a rotor of a brushless direct current (BLDC) motor;
   a lead angle control unit configured to:
   determine a lead angle based on a detection signal from the position sensor; and
   output a lead angle control signal that is configured to represent a compensated phase current converting time corresponding to the lead angle;
   a phase current converter configured to output a phase current conversion signal based on the detection signal from the position sensor and the lead angle control signal, wherein the phase current conversion signal determines a phase current step of a stator of the BLDC motor; and
   a signal holder configured to:
   receive the detection signal and the lead angle control signal;
   hold the detection signal and the lead angle control signal for a predetermined amount of time; and
   provide the detection signal and the lead angle control signal to the phase current converter simultaneously.

2. The controller of claim 1, wherein the signal holder comprises a plurality of flip-flops where each flip-flop is configured to:
   have an input for receiving the detection signal and the lead angle control signal;
   hold the detection signal and the lead angle control signal; and
   have an output for providing the detection signal and the lead angle control signal to the phase current converter simultaneously by a common control pulse.

3. The controller of claim 2, wherein the plurality of flip-flops is a plurality of D-flip-flops where each D-flip-flop is configured to output the detection signal and the lead angle control signal simultaneously at a rising edge or a falling edge of a control pulse having a predetermined frequency.

4. The controller of claim 1, wherein the position sensor is a hall sensor configured to sense a S-pole or a N-pole on a rotor of the BLDC motor.

5. The controller of claim 1, wherein the phase current converter is configured to output a phase current conversion signal for determining a predetermined phase current step to an inverter, wherein the inverter is configured to provide a phase current to the BLDC motor based on the detection signal of the position sensor and the lead angle control signal.

6. The controller of claim 3, wherein the position sensor is a hall sensor configured to sense a S-pole or a N-pole on a rotor of the BLDC motor.

7. The controller of claim 3, wherein the phase current converter is configured to output a phase current conversion signal for determining a predetermined phase current step to an inverter, wherein the inverter is configured to provide a phase current to the BLDC motor based on the detection signal of the position sensor and the lead angle control signal.

8. The controller of claim 1, wherein the BLDC motor is configured to rotate the rotor by converting phases of the stators.

9. The controller of claim 8, wherein the BLDC motor is configured to rotate the rotor in a six step phase conversion manner that selectively generates a potential difference of two phase stators among three phase stators.

10. The controller of claim 8, wherein the BLDC motor is configured to stimulate the two phase stators based on rotational state of the rotor.

* * * * *